Nov. 2, 1943.       S. H. BROOKS       2,333,292
TURRET-TYPE UNIVERSAL JOINT
Filed March 31, 1943
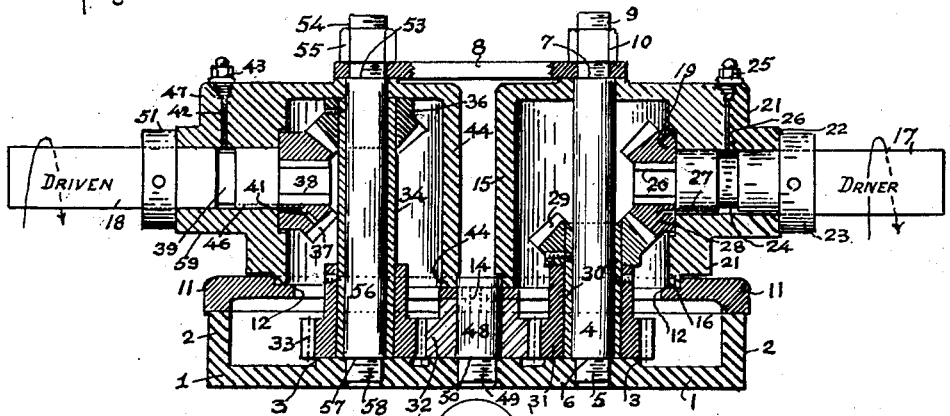
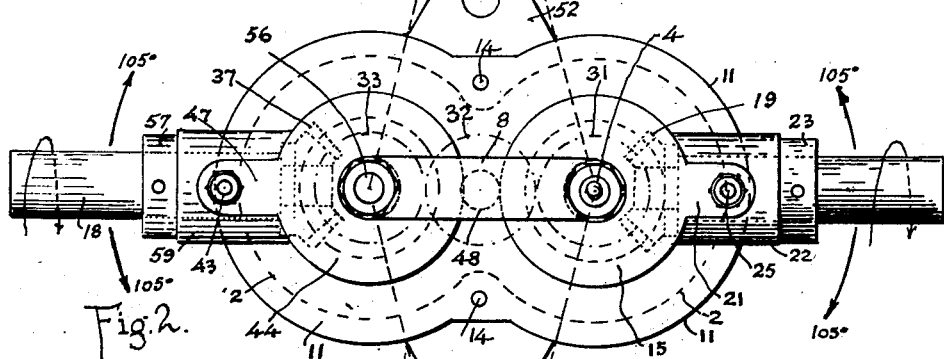
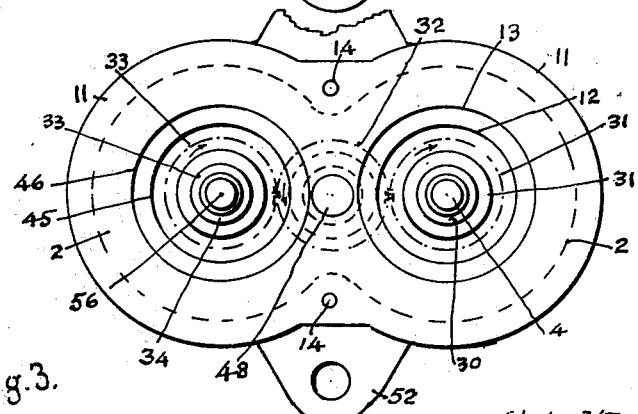
Stephen H. Brooks INVENTOR.

Patented Nov. 2, 1943

2,333,292

UNITED STATES PATENT OFFICE 2,333,292

TURRET-TYPE UNIVERSAL JOINT

Stephen H. Brooks, Beverly Hills, Calif., assignor to Brooks Equipment Corporation, New York, N. Y., a corporation of New York Application March 31, 1943, Serial No. 481,197

5 Claims. (Cl. 74—384)

My invention relates to improvements in turret-type universal joints and it more especially includes the features pointed out in the annexed claims.

The purpose of my invention is to provide a joint that is truly universal in that the driven end may be changed in alignment more than 180° and similarly the driver can also be changed more than 180° aggregating to more than 360°.

My present invention exceeds the universality of prior patents in that a change in alignment between the driving and the driven shaft of their disclosure is only, approximately 90°.

With these and other related ends in view I may use whatever modifications of my present disclosure that the exigencies of varying conditions may demand without departing from the broad spirit of the invention.

As an example of adaptation I illustrate on the accompanying drawing such instances as will disclose the broad features shown thereon and described herein.

Fig. 1 is an elevation in section.

Fig. 2 is a top plan of Fig. 1.

Fig. 3 is a top plan with the gear housings removed.

In the main the driving gear housings and the driven gear housings are duplicates of each other, except in the case of the driven housing to hold the same direction of revolution of the driving shaft the intermediate miter gear of the driver is below the miter gear on the driving shaft, while in the driven unit the intermediary miter gear is above the miter gear on the driven shaft.

Each gear housing is movable on a horizontal plane around a vertical pivot pin and the movement of one by the other is effected by means of a spur gear on each pivot post. An idler spur gear interconnects the spur gear on the pivot posts. In the case of the driver unit the underneath miter gear and its related spur gear are fastened onto a sleeve which surrounds the first pivot post. The driven unit, the upper miter gear and its cooperating spur gear are fastened to a tube that surrounds the second pivot post.

A detailed description of the several cooperating parts follows: There is a base 1 on which both the driving and driven units are supported for free horizontal movement within prescribed limits around their respective pivot pins 4 and 56. The base has an upstanding rim 2. Bosses 3 are formed on the upper surface of the base. In the right hand boss pivot pin 4 is secured by the threaded portion 5 that terminates at a shoulder 6. The pin projects above the driving gear housing 15. This housing has a concentric lower edge 16 which seats in a concentric recess 13 of the cover plate 11. This recess surrounds a clearance opening 12 for the hubs of spur gears 31 and 33. The upper end of pivot pin 4 has a shoulder 7 and a threaded extension 9. A tying yoke or keeper 8 rests against the shoulder 7. It is held in place by a nut 10 at the right hand end and by a nut 55 against a shoulder 53 of the "driven" pin 56. The nut is threaded onto the portion 54 of the pin. The keeper 8 stabilizes the upper ends of the pins 4 and 56 and holds them in spaced apart alignment.

The driven unit has a gear housing 44 that in turn has a concentric lower edge 45 which is seated in the concentric recess 46 of the cover plate 11. The upper portion of the housing has an opening through which the pivot pin 56 projects. The lower end of this pin has a shoulder 57. Below it the pin on a reduced diameter is threaded at 58. This unit's housing 44 has a side enlargement 47 which terminates into a hub 59 for the driven shaft 18. A collar 51 on the shaft 18, adjacent the hub 59 serves to hold the shaft 18 and its miter gear 37 in assembled relation. There is an upper central boss of the projection 47 on which the oil cup 43 is placed. An oil hole 42 leads from the cup to the annular oil recess 39 formed on the shaft 18. This recess in turn leads to the oil hole 41 in the miter gear 31 through a short channel 40 in the shaft 18. The shaft 18 at its inner end may be hexagonal in cross section at 38 to receive the miter gear 37 which has a similarly shaped opening. The miter gear 36 meshes with the upper part of the miter gear 37. It is fastened to the upper end of the tube 34. This tube at its lower end is fastened to the spur gear 33.

The driver gear housing 15 is also provided with a side projection 21 that terminates in a hub 22. A collar 23 holds the shaft 17 and the miter gear 19 in assembled relation. The rotating movement of the housing around pivot pin 4 is maintained by a concentric lower edge 16 engaging a concentric recess 13 of the cover plate 11. The shaft 17 terminates into a hexagon cross section 20 which enters a similarly shaped opening in the miter gear 19. The side projection 21 has an upper face boss on which an oil cup 25 is placed. An oil hole 26 leads to an annular oil chamber 24 formed on the shaft 17. A short oil channel 27 in the shaft leads from the chamber 24 to an oil hole 28 in the miter gear 19. This gear meshes with an underneath miter gear 29 that is fastened to a sleeve 30 which at its lower end is fastened to the spur gear 31.

The spur gears 31 and 33 are interconnected by an idling spur gear 32. This gear rotates loosely on the pivot pin 48 which has a threaded end 49 beneath a shoulder 50.

The base 1 has fastening ears 52 and a pair of dowel pins 14 for the cover plate 11. My universal joint is self contained, compact and easily installed wherever desired by making connection to the shafts 17 and 18.

All the gears, miter and spur, are approximately the same pitch diameter thus insuring that any rotative movement applied to the shaft 17 will be transmitted to exclusive similar rotative movement of the shaft 18.

What I claim is:

1. In universal joints capable of changes in alignment throughout 360 degrees, a driver unit adapted to a change in alignment of more than 90 degrees on each side of a normal alignment position, a driven unit adapted to a change in alignment of more than 90 degrees on each side of a normal alignment position, each unit being provided with angular intermeshing members, a train of spur gears connecting both units, said train including an idler gear, independent housings for each unit, and a support in common for both units.

2. In universal joints capable of changes in alignment through more than 360 degrees, a pair of substantial duplicate units serving respectively as a driver and a driven member, a support in common for both units, pivotal means on said support permitting each unit free movement around a vertical center independently of the other unit, means for limiting the movement of each unit around its vertical center to a change in arc position of more than 90 degrees on each side of a normal straight line passing through both centers.

3. A universal joint capable of changes in alignment of more than 360 degrees between a driver unit and a driven unit which comprises a driver gear unit, a vertical pivot therefor, a driven gear unit, a vertical pivot for said unit, a support in common for both units, each gear unit being provided with angular transmission elements and a shaft connected with and projecting from each unit, means for transmitting reverse motion from one unit to the other, means for joining the said pivots externally of said units to maintain the respective centers a predetermined distance apart, and means for securing the other ends of said pivots to the aforesaid support whereby each unit independently of the other is capable of movement concentric with its pivot of more than 180 degrees.

4. A universal joint including a driver unit which comprises a driving shaft, a gear housing, a vertical pivot for the housing, intermeshing right angled transmission members actuated by the shaft, a similar driven gear housing, a vertical pivot therefor, a shaft projecting therefrom, intermeshing right angled transmission members for driving the shaft, a spur gear horizontally connecting the gear elements in each unit, an idler gear interconnecting the said spur gears, and a support in common for both units.

5. In universal joints capable of changes in alignment between a driver and a driven unit of more than 360 degrees which comprises a driver shaft, a housing therefor, a vertical pivot for the housing, a miter gear on the end of the shaft within the housing, a miter gear meshing with under side of the first gear, a loose sleeve on the pivot attached to the second miter gear, a spur gear attached to the other end of the sleeve, a driven shaft and a housing therefor, a vertical pivot for said housing, a miter gear on the end of said shaft within the housing, a second miter gear engaging the first miter gear on its upper side, a loose sleeve attached to the said second gear, a spur gear attached to the other end of said sleeve, an intermediate pivot pin positioned between the other pivot pins, an idler spur gear rotatable on said pin and engaging the aforesaid spur gears to transmit motion from the driver shaft to the driven shaft in the same direction, a support in common for said pivot pins and said gear housings whereby said housings are movable in arcs concentric with said pivot pins independently of each other to more than 180 degrees and collectively to more than 360 degrees.

STEPHEN H. BROOKS.